Patented Dec. 31, 1929

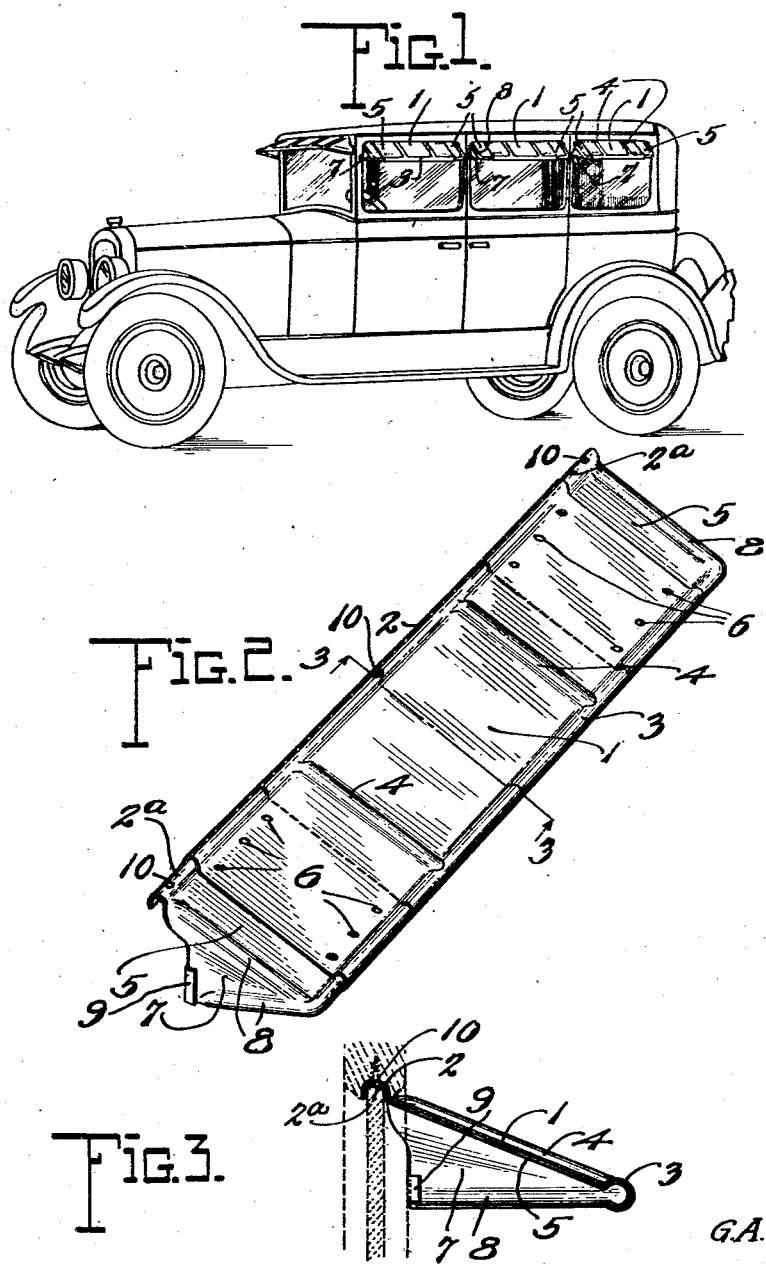

1,741,202

UNITED STATES PATENT OFFICE

GILBERT A. ROTH, OF HASTINGS, NEBRASKA, ASSIGNOR TO G. A. ROTH MANUFACTURING CO., OF HASTINGS, NEBRASKA

AUTOMOBILE AWNING

Application filed November 30, 1926. Serial No. 151,653.

The present invention relates to an awning or visor attachment for window frames, and among the objects of the invention are to provide a device of this character which embodies novel features of construction whereby it can be readily secured in place at the top of conventional window frames and will not only serve as a protection against strong light and stormy weather, but will enable the window to be lowered from the top to obtain ventilation in inclement weather.

The awning or visor attachment of this invention is well adapted for use on the side windows of motor vehicles, and it can be secured in position without the necessity of defacing or drilling any holes in the outside of the body of the vehicle and without interfering in any manner with the raising and lowering of the window glass.

More specifically the invention contemplates an awning or visor attachment which is held in position essentially by means of a hollow rib at the upper end thereof which fits in the glass receiving groove at the top of the window frame, the hollow portion of the rib opening downwardly so that it will receive the window glass when the window is closed.

The invention also contemplates the provision of an awning or visor attachment of this character, which is adjustable in length so that it can be fitted to various sizes of windows.

While one particular embodiment of the invention is shown and described in detail for illustrative purposes, it will be understood that many modifications and changes can be made in the details of construction without departing from the spirit of the invention.

For a full understanding of the invention reference is to be had to the following description and accompanying drawings in which, Figure 1 is a view showing the application of the invention to an automobile;

Figure 2 is a perspective view of an awning or visor attachment for windows which is constructed in accordance with the invention.

Figure 3 is a transverse sectional view through the same on the line 3—3 of Figure 2.

Corresponding and like parts are referred to in the following description and indicated on all of the views of the drawing by like reference characters.

Referring to the drawings, which illustrate one of many possible embodiments of the invention, the numeral 1 designates the body portion of the awning or visor attachment, and this may be formed of sheet material of any suitable character. One of the longitudinal edges of the sheet material is bent to form a hollow rib 2 which has an inverted U-shaped formation, said rib extending upwardly from the body portion at an angle thereto and opening downwardly. The opposite edge of the body portion 1 is bent or rolled to form a hollow bead 3 which has an opening at the inner side thereof. At suitable intervals transverse ribs 4 extend across the body portion and connect the upper rib 2 to the hollow bead 3.

End plates 5 are slidably mounted upon the opposite ends of the body portion 1. These end plates 5 are formed with upper ribs which correspond with and are slidably received within the rib 2 of the body portion, and also with hollow beads 3ª at the opposite edges thereof which are slidably received within the hollow bead 3 of the body portion. The end plates can thus be telescoped in and out, and, if desired, they may be secured in an adjusted position by suitable fastening members 6. Each of the end plates is also formed with an end wall 7, reinforcing ribs 8 being formed at the intersection of the end walls 7 and end plates and also at the lower edge of each of the end walls. The inner edge of each of the end walls 7 is cut away to conform to the shape of the window frame and preferably provided with a cushion foot 9 of rubber or like material to rest on the face of the window frame.

The awning or visor attachment is intended to be secured in position by fitting the hollow ribs 2 and 2ª of the body portion and end plates or extensions in the groove at the top of the window frame. Suitable openings 10 are formed in these ribs and screws or similar fastening members can be inserted through these openings to fasten the device in place. The hollow interiors of the ribs open downwardly so that they will receive the upper edge of the window glass when the window is closed. The device does not interfere in any manner with the opening and closing of the window and when in place it provides an awning or visor which is a protection against strong light and inclement weather and will enable the window to be lowered from the top for ventilating purposes in stormy weather. The attachment can be secured in position without the necessity of drilling any openings in the face of the window frame and the vehicle or window frame to which it is applied is not defaced in any manner.

Having thus described my invention what I claim as new and desire to secure by Letters Patent is:

1. An awning attachment for windows including an awning body, an end extension slidably mounted thereon, the awning body and extension being formed at opposite edges thereof with corresponding inverted U-shaped ribs and hollow beads, the ribs and beads telescoping within each other and the ribs being adapted to enter the groove of a window frame.

2. An awning attachment for windows including an awning body, an end extension slidably mounted thereon and formed with an integral depending end wall, a rib extending along an edge of the awning body and adapted to enter the groove of the window frame, and a foot on the depending end wall for engaging the front of the window frame.

3. As a new article of manufacture, an awning attachment for vehicle windows including an overhanging awning portion, depending ends therefor pressed outwardly beyond the extremities of the awning portion, and means for securing an upper edge of the awning portion in the top groove of a window frame, said upper edge of the awning portion being engaged by the upper edge of the window when closed, and said depending ends having supporting engagement with the window frame out of alignment with the window frame groove by reason of being pressed outwardly sufficiently for this purpose, as above set forth.

4. As a new article of manufacture, an awning attachment for vehicle windows including an overhanging awning portion, depending ends therefor pressed outwardly beyond the extremities of the awning portion, means for securing an upper edge of the awning portion in the top groove of a window frame, said upper edge of the awning portion being engaged by the upper edge of the window when closed, and resilient feet on the depending ends, said resilient feet being adapted to have supporting engagement with the window frame out of alignment with the window frame groove, when the attachment is applied to an automobile window.

In testimony whereof I affix my signature.

GILBERT A. ROTH.